US011911752B2

(12) United States Patent
Pabst et al.

(10) Patent No.: US 11,911,752 B2
(45) Date of Patent: Feb. 27, 2024

(54) HONEYCOMB BODY AND METHOD FOR PRODUCING THE HONEYCOMB BODY

(71) Applicant: Vitesco Technologies GmbH, Hannover (DE)

(72) Inventors: Christoph Pabst, Schwalbach a Ts. (DE); Peter Hirth, Schwalbach a Ts. (DE); Ferdi Kurth, Schwalbach a Ts. (DE); Michael Voit, Schwalbach a Ts. (DE); Sven Schepers, Schwalbach a Ts. (DE)

(73) Assignee: VITESCO TECHNOLOGIES GMBH, Regensburg (DE)

( * ) Notice: Subject to any disclaimer, the term of this patent is extended or adjusted under 35 U.S.C. 154(b) by 430 days.

(21) Appl. No.: 17/057,792

(22) PCT Filed: May 16, 2019

(86) PCT No.: PCT/EP2019/062604
§ 371 (c)(1),
(2) Date: Nov. 23, 2020

(87) PCT Pub. No.: WO2019/224095
PCT Pub. Date: Nov. 28, 2019

(65) Prior Publication Data
US 2021/0197184 A1 Jul. 1, 2021

(30) Foreign Application Priority Data
May 23, 2018 (DE) ...................... 10 2018 208 098.4

(51) Int. Cl.
B01J 35/04 (2006.01)
B01D 53/94 (2006.01)
(Continued)

(52) U.S. Cl.
CPC ............ *B01J 35/04* (2013.01); *B01D 46/248* (2021.08); *B01D 46/249* (2021.08);
(Continued)

(58) Field of Classification Search
CPC .. B01J 35/04; B01D 46/2455; B01D 46/2474; B01D 46/248; F01N 3/281; F01N 2330/02; F01N 2330/30
(Continued)

(56) References Cited

U.S. PATENT DOCUMENTS 3,088,271 A 5/1963 Smith
5,593,645 A 1/1997 Steenackers et al.
(Continued)

FOREIGN PATENT DOCUMENTS

CN 101198405 6/2008
DE 100 56 279 5/2002
(Continued)

OTHER PUBLICATIONS

Teshigawara, H. WO2014118983A1—translated document. (Year: 2014).*
(Continued)

*Primary Examiner* — Jelitza M Perez
(74) *Attorney, Agent, or Firm* — Cozen O'Connor

(57) ABSTRACT

A honeycomb body for exhaust gas aftertreatment includes a plurality of interconnected metal foils stacked on one another. The honeycomb body has a central first flow channel running in the axial direction of the honeycomb body, as an inflow section, and has a plurality of second flow channels between in each case two mutually adjacent metal foils. The first flow channel is in fluid communication with the second flow channels. The second flow channels formed
(Continued)

between two mutually adjacent metal foils run in a straight line and parallel to one another along a radial direction of the honeycomb body.

8 Claims, 3 Drawing Sheets

(51) Int. Cl.
 *B23K 1/00* (2006.01)
 *F01N 3/28* (2006.01)
 *B01D 46/24* (2006.01)
 *B23K 101/02* (2006.01)
(52) U.S. Cl.
 CPC ..... *B01D 46/2455* (2013.01); *B01D 46/2474* (2013.01); *B01D 53/94* (2013.01); *B23K 1/0014* (2013.01); *F01N 3/281* (2013.01); B01D 2255/9155 (2013.01); B23K 2101/02 (2018.08); F01N 2330/02 (2013.01); F01N 2330/30 (2013.01)
(58) Field of Classification Search
 USPC .......................................................... 422/177
 See application file for complete search history.

(56) References Cited

U.S. PATENT DOCUMENTS

| 5,902,558 | A | 5/1999 | Maus et al. | |
|---|---|---|---|---|
| 10,865,681 | B2 * | 12/2020 | Buechler | ............... F01N 3/0215 |
| 2004/0064927 | A1 | 4/2004 | Brueck et al. | |

FOREIGN PATENT DOCUMENTS

| DE | 101 17 086 | 10/2002 | | |
|---|---|---|---|---|
| DE | 696 22 777 | 4/2003 | | |
| DE | 10 2008 044 711 | 3/2010 | | |
| DE | 102 35 691 | 12/2011 | | |
| DE | 10 2012 104 767 | 12/2013 | | |
| DE | 10 2016 215 289 | 2/2018 | | |
| EP | 0 676 535 | 10/1995 | | |
| EP | 0 676 534 | 8/1998 | | |
| WO | WO 2014/118983 | 8/2014 | | |
| WO | WO-2014118983 A1 * | 8/2014 | .............. | B01J 23/40 |
| WO | WO 2018/075931 | 4/2018 | | |
| WO | WO-2018075931 A1 * | 4/2018 | ........... | F01N 3/0215 |

OTHER PUBLICATIONS

Office Action dated Oct. 27, 2021 issued in Chinese Patent Application No. 201980033906.4.
International Search Report issued in corresponding PCT Application PCT/EP2019/062604.
Written Opinion issued in corresponding PCT Application PCT/EP2019/062604.
Office Action issued in corresponding German application No. DE 10 2018 208 098.4.

* cited by examiner

FIG. 1A
FIG. 1B
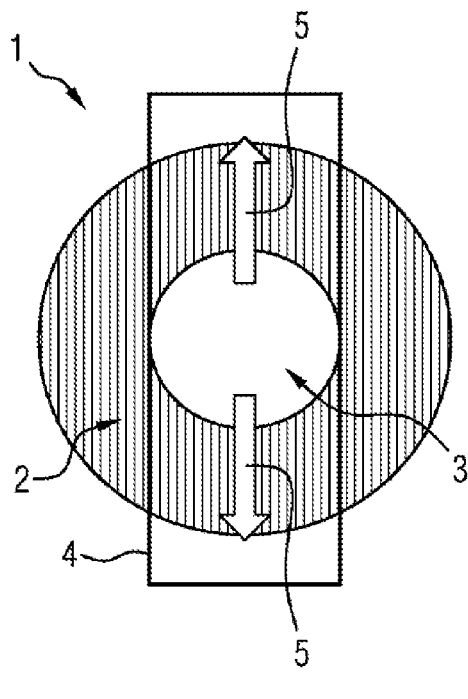
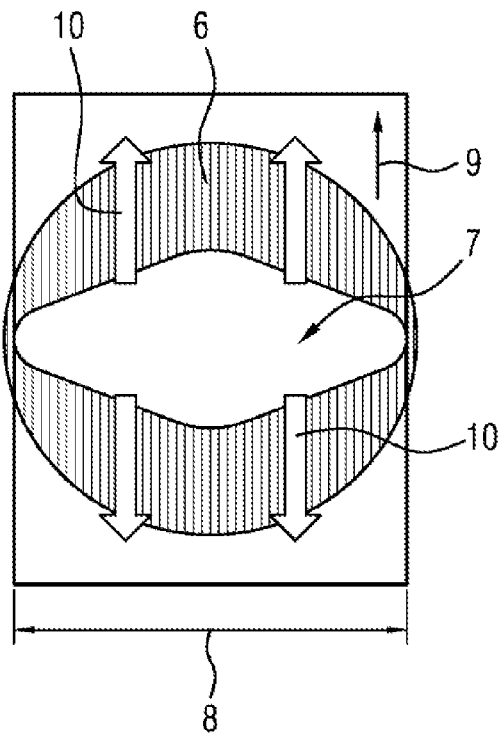
FIG 2
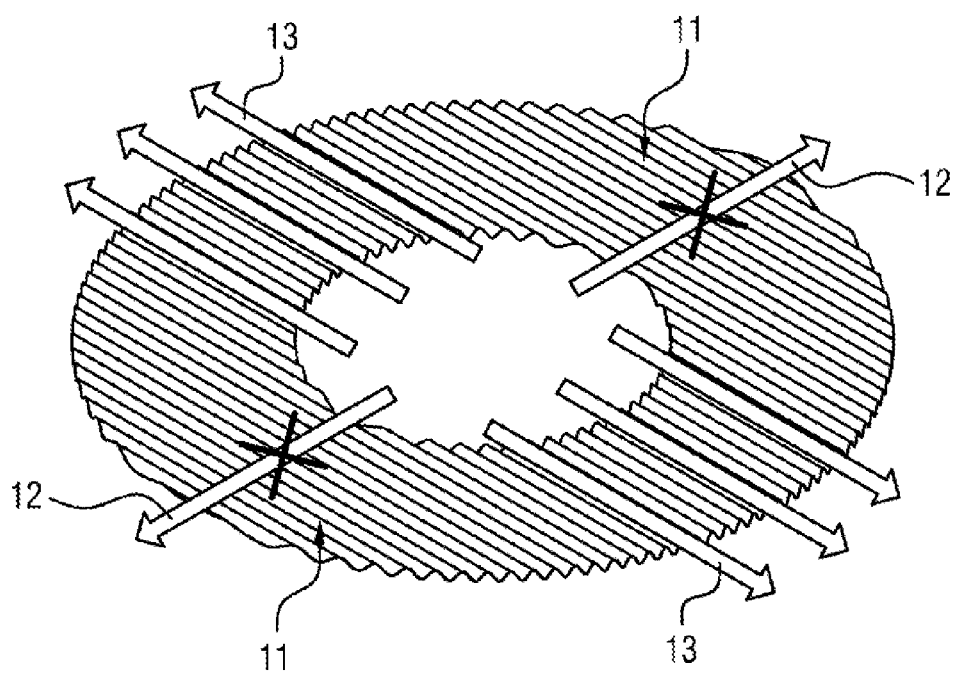

HONEYCOMB BODY AND METHOD FOR PRODUCING THE HONEYCOMB BODY

CROSS REFERENCE TO RELATED APPLICATIONS

This is a U.S. national stage of International application No. PCT/EP2019/062604, filed on May 16, 2019, which claims priority to German Application No. 10 2018 208 098.4, filed May 23, 2018, the content of each of which is incorporated herein by reference.

BACKGROUND OF THE INVENTION

1. Field of the Invention

The invention relates to a honeycomb body for exhaust gas aftertreatment.

2. Description of the Prior Art

For exhaust gas aftertreatment purposes, use is made of different honeycomb bodies, which are generally referred to as catalytic converters. A common feature of the honeycomb bodies is essentially that they form a plurality of channels through which a flow can pass and along which the exhaust gas to be cleaned can flow. The material of the walls forming the channels or the coating of the material is selected such that a desired chemical reaction with individual components of the exhaust gas takes place, as a result of which the affected components of the exhaust gas are converted into less harmful products.

The honeycomb bodies known in the prior art, apart from the respective channel geometry, differ from one another in particular also by the throughflow direction. For example, the prior art discloses honeycomb bodies through which a flow passes once or repeatedly with deflections along an axial direction, or else honeycomb bodies through which a flow passes once or repeatedly in the radial direction.

The honeycomb bodies are formed, for example, by differently shaped metal layers stacked on one another, with the channels being formed by cavities between the metal layers.

In particular in the case of the honeycomb bodies through which a flow passes radially, a plurality of radially running flow channels are known allowing a flow to pass from a central, axially running flow channel through radially running channels to a flow channel lying on the outside in the radial direction. The flow channels are formed, for example, by corrugated metal layers that are spaced apart from one another by smooth metal layers. The corrugated metal layers are produced, for example, by deep drawing circular, smooth sheet metal layers.

A disadvantage of the honeycomb bodies through which a flow passes radially and of the production methods for producing the honeycomb bodies is, in particular, that the forming of the annular metal layers generates stresses within the sheet metal layers that may even destroy the sheet metal layers. The molding of the channels into sheet metal layers by embossing limits the maximum height of the channels since the material flowing in during the embossing is significantly limited. Therefore, the relatively flat channels may lead, during subsequent soldering and coating, to increased deposits of solder material and the washcoat used, which promotes the blocking of individual channels. In addition, the production is very slow, since the embossing is a discontinuous process and a very exact positioning of the sheet metal layers is necessary in order to achieve a sufficiently precise embossing of the channels. This increases the cycle times, which in turn leads to high production costs.

SUMMARY OF THE INVENTION

It is therefore an object of the present invention to create a honeycomb body through which a flow can pass radially and which has an optimized channel geometry. In addition, it is an object to provide a method for producing a honeycomb body according to the invention.

These objects relating to the honeycomb body may be achieved by a honeycomb body for exhaust gas aftertreatment, comprising a plurality of interconnected metal foils stacked on one another, wherein the honeycomb body has a central first flow channel running in the axial direction of the honeycomb body, as an inflow section, and has a plurality of second flow channels between in each case two mutually adjacent metal foils, wherein the first flow channel is in fluid communication with the second flow channels, wherein the second flow channels formed between two mutually adjacent metal foils run in a straight line and parallel to one another along a radial direction of the honeycomb body.

The flow can pass through the honeycomb body preferably such that exhaust gas flows through the central first flow channel in an axial direction and the exhaust gas is then deflected by 90 degrees and flows through the second flow channels in the radial direction. On exiting the second flow channels, the exhaust gas finally flows into an annular gap which is formed between the honeycomb body and a housing surrounding the honeycomb body. The exhaust gas can then flow out of the annular gap, for example in the axial direction.

The second flow channels run parallel to one another along a radial direction of the honeycomb body and at a 90 degree angle to the first flow channel.

The second flow channels thus expressly do not run in a star-shaped manner away from the central axial axis of the honeycomb body towards the radially outer region of the honeycomb body, as is the case with honeycomb bodies from the prior art. The second flow channels in the exemplary embodiment according to the invention thus do not converge centrally at a common point, but rather run parallel to one another from one side of the honeycomb body to the opposite side.

It is particularly advantageous if the second flow channels between mutually adjacent metal foils are formed by corrugations in the metal foils, wherein metal foils which are in each case directly mutually adjacent are arranged rotated with respect to one another by an angle of at least 5 degrees about the central axis of the honeycomb body.

In particular, if there are no non-corrugated smooth layers between the corrugated metal foils, the individual metal foils have to be arranged rotated by a certain angular offset from one another so that the metal foils do not slide into one another. By rotating the individual metal foils by a minimum angle about the central axis, which runs centrally in the axial direction of the honeycomb body, the second flow channels between adjacent layers formed by the metal foils are also rotated relative to one another.

The effect achieved by this offset, paired with the property that the second flow channels in each layer run in a straight line and parallel to each other, is that the second flow channels of the mutually adjacent layers also open into the annular gap surrounding the honeycomb body, in a manner rotated with respect to one another by the angle of rotation.

In this way, for example, an improved distribution of exhaust gas in the annular gap can be achieved.

It is also advantageous if the first flow channel is formed by cutouts in the metal foils stacked on one another, wherein each metal foil has a respective cutout.

The first flow channel preferably runs in the axial direction of the honeycomb body and in the region of the central axis of the honeycomb body. Each of the metal foils has a cutout in this region. By stacking the metal foils on one another, the first flow channel is thus produced by the cutouts in the individual metal foils.

A preferred exemplary embodiment is characterized in that the respective cutout in the respective metal foils has a substantially longer first extent in a direction transverse to the direction of extent of the second flow channels formed by the corrugation of the metal foil than the second extent of the cutout in a direction parallel to the direction of extent of the second flow channels formed by the corrugation of the metal foil.

A cutout having extents of differing length along the direction of the second flow channels and transversely with respect to the direction is particularly advantageous in order such that as many of the second flow channels as possible are intersected by the cutout forming the first flow channel.

Owing to the arrangement according to the invention of the second flow channels or of the corrugation of the metal foils, flow can be directly transferred from the first flow channel into a second flow channel only at the second flow channels, which are intersected by the cutout. It is therefore preferable if as many of the second flow channels as possible per layer are intersected by the first flow channel or by the cutout.

The cutouts therefore preferably have a considerably greater extent in the direction transversely with respect to the direction of extent of the second flow channels, the extent ideally intersecting as many second flow channels as possible.

It is also preferable if the cutout along its first longer extent intersects at least 70%, particularly preferably at least 80%, in particular at least 90% of the second flow channels formed in the respective metal foil. As already described, it is more advantageous for a greater number of second flow channels to be intersected. However, this also has to be seen in the context of the stability of the individual metal foil and of the entire honeycomb body. A sufficiently wide edge has to remain between the cutout and the radial outer end region in order to prevent the metal foil from tearing out in the region.

The second flow channels in the edge region cannot be acted upon directly with exhaust gas from the first flow channel. However, depending on the structure of the honeycomb body, an overflow from second flow channels from adjacent layers may occur. Exhaust gas from the annular gap surrounding the honeycomb body can also flow through the second flow channels, which are not intersected by the cutout, which can lead to better uniform distribution of the exhaust gas.

In addition, it is advantageous if the metal foils forming the honeycomb body are corrugated, wherein metal foils arranged directly mutually adjacent are arranged rotated with respect to one another by, in each case, 90 degrees around the central axis. This is advantageous to obtain a particularly stable honeycomb body and to prevent the individual metal foils from sliding into one another.

The effect furthermore achieved by a construction of the honeycomb body with exclusively corrugated metal foils, which are arranged rotated with respect to one another by 90 degrees, is that an overflow between the second flow channels which are directly mutually adjacent is made possible. The second flow channels of the metal foils, which are directly mutually adjacent, lie crosswise on one another in the honeycomb body such that an overflow between individual second flow channels is possible.

It is also expedient if the second flow channels are aligned in the same direction across the honeycomb body and a smooth metal foil is arranged between each two metal foils having a corrugation.

In addition, it is advantageous if the corrugated metal foils have a corrugation with wave crests and wave troughs which run parallel to one another and extend over the entire width of the metal foils. In particular, the wave troughs and the wave crests extend from one side on the outer circumference to the opposite side on the outer circumference.

One exemplary embodiment of the invention relates to a method for producing a honeycomb body, wherein the following production steps are carried out:
punching out a metal foil,
embossing the corrugation in the metal foil,
stacking the metal foils,
soldering the metal foils with a solder, and
soldering the metal foils to form a honeycomb body.

Such a method is advantageous to produce the greatest possible number of honeycomb bodies in as little time as possible with the highest possible degree of automation.

Furthermore, it is preferable if the metal foils after being punched out have an oval outline, wherein the embossing of the corrugation produces migration of the material, as a result of which the metal foils have a circular outline after the embossing of the corrugation.

Due to the regularly very thin metal foils, the problem arises that only a very limited amount of material is available that can flow in during the embossing shaping process. Cracks may thus rapidly arise in the metal foil. This is also a particular problem in the production of metal foils with flow channels emerging in a star-shaped manner from the center, as are known in the prior art. In addition, the maximum achievable height of the wave crests and troughs is limited by the limited amount of material flowing in, which is why the flow channels produced as a result are limited in size.

The method according to the invention ensures that the metal foil after being punched out has a certain additional portion of material, which can then flow in during the embossing. This portion of material used for flowing is defined by the difference in area between the punched-out oval metal foil and the finished, embossed circular metal foil.

The embossing can preferably be undertaken by embossing rollers that continuously transfer a pattern of corrugations onto the individual metal foils. The procedure can thus be automated to a great extent and can be used in large-scale production.

In addition, it is preferable if the corrugated metal foils are stacked on one another rotated in each case by 90 degrees with respect to one another, wherein all of the metal foils forming the honeycomb body are identical. This is advantageous in order to produce a honeycomb body that allows an overflow between the second flow channels.

It is also advantageous if alternately corrugated metal foils and non-corrugated smooth metal foils are stacked on one another, wherein the second flow channels are aligned in the same direction with respect to one another. This can lead to a honeycomb body having increased strength. The smooth layers here can also have smaller openings and/or guide structures in order to enable an overflow between the second flow channels to a defined extent even with such a structure.

Advantageous developments of the present invention are described herein and in the following description of the figures.

BRIEF DESCRIPTION OF THE DRAWINGS

The invention will be explained in detail in the following text on the basis of exemplary embodiments with reference to the drawings. In the drawings:

FIGS. 1A and 1B show a top view of two corrugated metal foils, wherein the left metal foil has a circular central cutout and the right metal foil has a diamond-shaped cutout;

FIG. 2 shows a perspective view of a corrugated metal foil;

DETAILED DESCRIPTION OF THE PRESENTLY PREFERRED EMBODIMENTS

Figure 3:
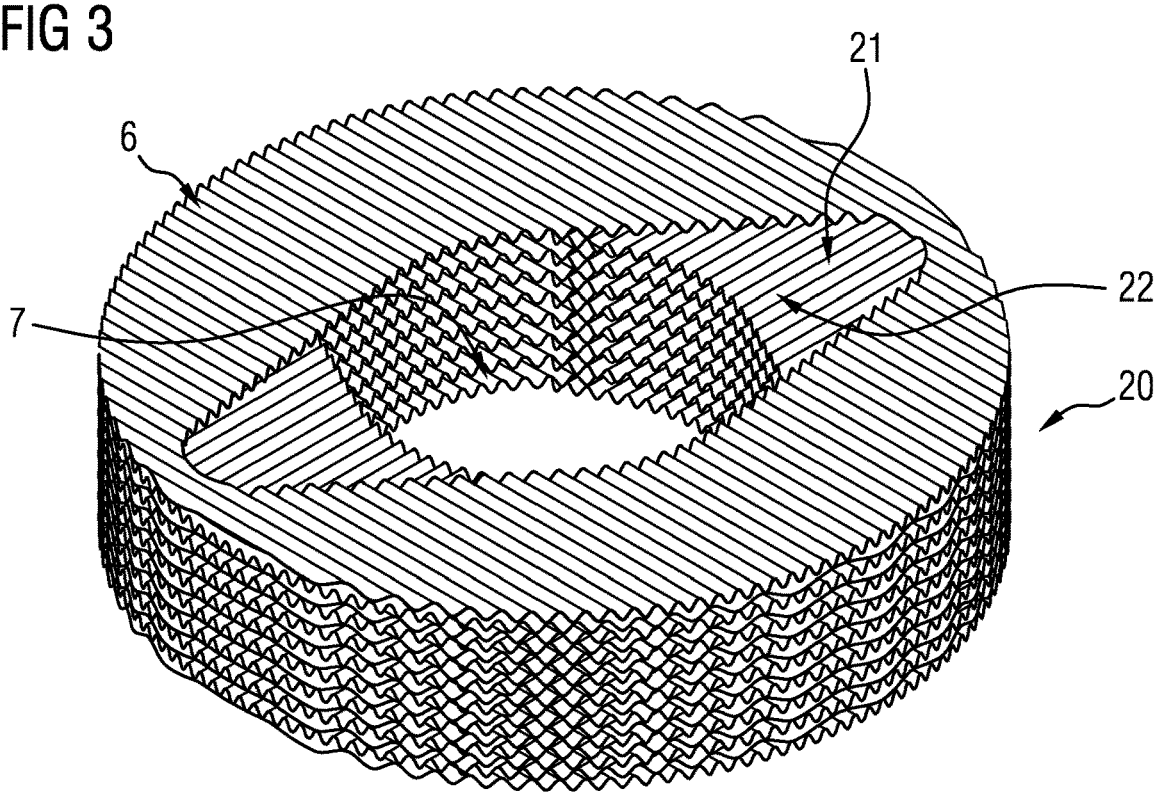
FIG. 3 shows a perspective view of a honeycomb body composed of a plurality of metal foils stacked on one another.

FIG. 1A in the left region shows a structured metal foil 1 with an embossed corrugation 2. The corrugation 2 produces wave crests and wave troughs which run parallel to one another and extend over the entire width of the metal foil 1.

The metal foil 1 has a central cutout 3. The metal foil 1 and the cutout 3 have a circular circumference, which has resulted by the embossing of the corrugation 2 from the originally oval metal foil.

The box 4 indicates the region of the metal foil 1 through which a flow can pass from the cutout 3 forming the first flow channel, since the second flow channels produced by the corrugation 2 open into the cutout 3 in this region or are intersected by said cutout. The arrows 5 indicate the possible flow through the second flow channels. It can be seen here that only a straight flow through the second flow channels opening into the cutout 3 is possible.

In FIG. 1B, a metal foil 6 with a circular circumference is shown. In contrast to FIG. 1A, the metal foil 6 has a diamond-shaped cutout 7 which has a significantly larger spatial extent 8 in a direction transverse to the direction of extent 9 of the second flow channels than in a direction parallel to the direction of extent 9 of the second flow channels. The arrows 10 indicate the possible flow through the second flow channels.

Owing to the significantly larger extent 8 of the cutout 7, a substantially larger amount of second flow channels is intersected by the cutout 7 such that an overflow from the first flow channel formed by the cutout 7 into more second flow channels is possible than in FIG. 1A.

The loss of surface area resulting from the enlarged cutout 7 is compensated for by the surface, over which the flow additionally flows, of the second flow channels, through which the flow additionally passes.

FIG. 2 shows a further view of a corrugated metal foil 2, as has already been shown FIG. 1A. In the perspective view of FIG. 2, the second flow channels 11, which are produced by the corrugation of the metal foil 2, can be clearly seen. The difference with respect to a metal foil having radially aligned flow channels can be seen particularly readily in FIG. 2.

While, in the case of such metal foils, all of the flow channels are acted upon with exhaust gas from the flow channel formed by the central cutout, in the case of the metal foil 2 having the linear second flow channels 11, only the second flow channels 11 are acted upon with exhaust gas from the central cutout 3, these flow channels being intersected by the cutout 3. Accordingly, it is also only possible for a flow to pass through the second flow channels 11 in two of four spatial directions. In the direction transverse to the course of the second flow channels 11, the flow of exhaust gas is prevented by the corrugation of the metal foil 2. This is shown by the crossed-through arrows 12, which show the blocked flow directions. The arrows 13 show the directions along which the exhaust gas can flow.

FIG. 3 shows a honeycomb body 20 which is formed from a plurality of metal foils 6, as can be seen in FIG. 1B.

The honeycomb body 20 is formed from a stack of a plurality of metal foils 6, wherein the metal foils 6 which are directly mutually adjacent are arranged rotated in each case by 90 degrees with respect to one another. This leads to the fact that the second flow channels 22 formed by the corrugation 21 are likewise arranged in layers rotated by 90 degrees with respect to one another. The second flow channels 22 thus lie alternately one above the other in a crosswise manner. The effect advantageously also achieved by this arrangement is that exhaust gas can flow over between the second flow channels 22, which are rotated by 90 degrees with respect to one another, such that a flow can also flow through second flow channels 22 that are not intersected by the central cutout 7. As a result, the portion of the second flow channels 22 through which the flow passes is increased overall, as a result of which the flow action on the individual layers is significantly improved.

In addition, the flow through the second flow channels 22 becomes more turbulent, since a certain portion of the exhaust gas will flow back and forth between crosswise overlapping second flow channels 22. Furthermore, it is advantageous that by dispensing with separating smooth layers between the corrugated metal foils 6, a saving on material is achieved.

Figure 4:
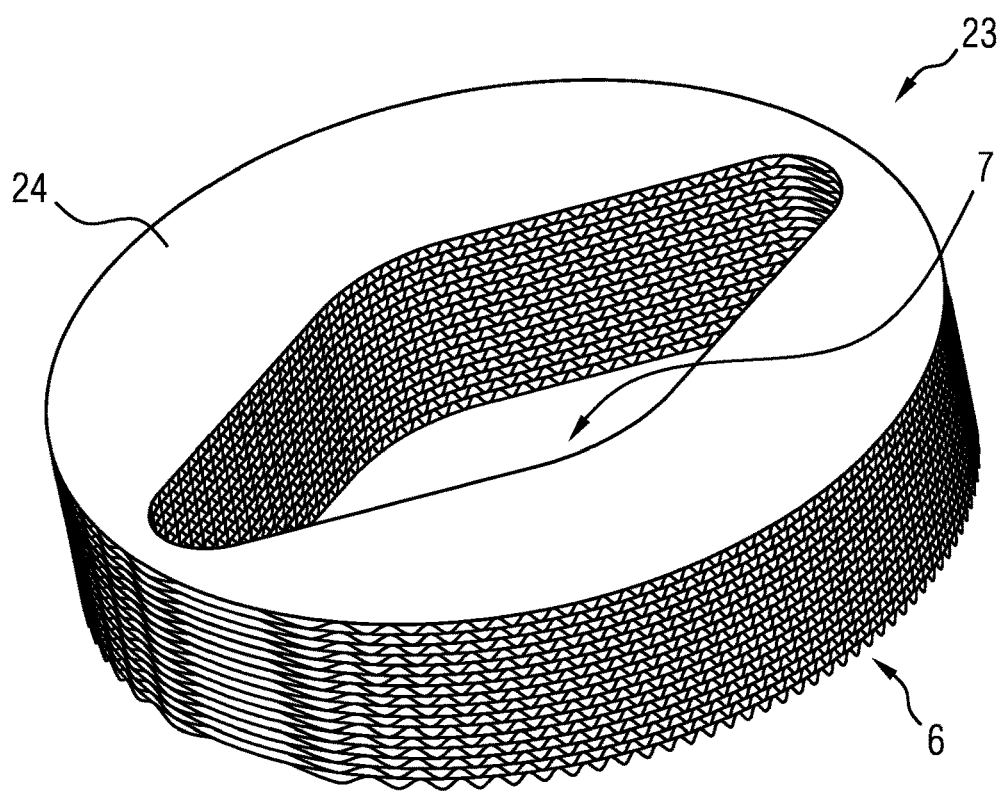
FIG. 4 show a perspective view of a honeycomb body composed of a plurality of metal foils stacked on one another, wherein non-corrugated smooth metal foils are also arranged between the corrugated metal foils.

FIG. 4 shows an alternative refinement of a honeycomb body 23. In contrast to the honeycomb body 22 in FIG. 3, here the individual corrugated metal foils 6 are separated from one another by smooth layers 24. The second flow channels are thus formed between those respective surfaces of the metal foils 6 which face the smooth layers 24 and the smooth layers 24. The metal foils 6 are aligned in the same direction such that all of the second flow channels run parallel to one another.

The honeycomb body 23 likewise has a diamond-shaped cutout 7. The smooth layers 24 mean that an overflow between second flow channels of different metal foils 6 is not possible. Exhaust gas thus cannot flow through second flow channels that are not intersected by the cutout 7.

This applies at least as long as the smooth layers 24 do not have any openings or guide elements of any other type which allow a targeted overflow between the second flow channels.

Figure 5:
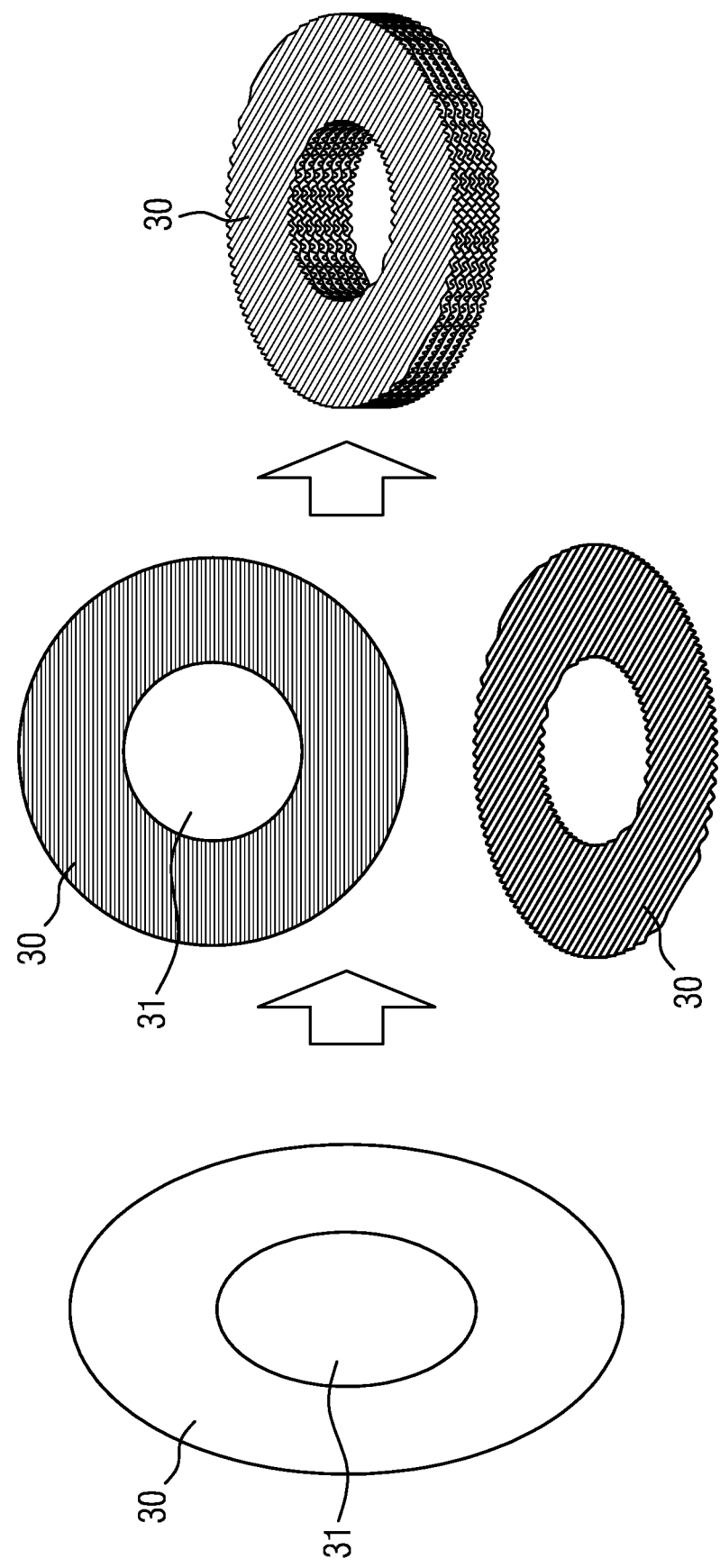
FIG. 5 shows a view which clarifies the method sequence, wherein the processing path from an oval base foil to the corrugated round metal foil and finally to the stacked honeycomb body is shown.

FIG. 5, in the left part, shows a metal foil 30 after it has been punched out of a metal strip unwound from a coil. It can be seen that the metal foil has an oval outline and the cutout 31 is also oval. In the middle part, the metal foil 30 is shown in two views, wherein the metal foil 30 already has the corrugation here. It can be seen that the metal foil 30 and also the cutout 31 now have a circular outline. In the right part, a stack of a plurality of the metal foils 30 is shown. In order to prevent the individual metal foils 30 from sliding into one another, they are arranged rotated with respect to one another by at least 5 degrees about the center axis.

The different features of the individual exemplary embodiments can also be combined with one another. The exemplary embodiments in FIGS. 1A to 5 are in particular not of a limiting nature and serve for illustrating the concept of the invention.

Although exemplary embodiments have been discussed in the above description, it should be noted that numerous modifications are possible. Furthermore, it should be noted that the exemplary embodiments are merely examples which are not intended to limit the scope of protection, the applications and the structure in any way. Rather, a person skilled in the art will take from the above description a guideline for implementation of at least one exemplary embodiment, wherein various modifications may be made, in particular with regard to the function and arrangement of the described components, without departing from the scope of protection as can be gathered from the claims and equivalent feature combinations.

The invention claimed is:

1. A honeycomb body for exhaust gas aftertreatment, comprising:
 a plurality of interconnected metal foils having a respective diamond-shaped cutout, each of the interconnected metal foils being stacked on one another;
 wherein the honeycomb body has a central first flow channel running in the axial direction of the honeycomb body, as an inflow section, and has a plurality of second flow channels between in each case two mutually adjacent metal foils;
 wherein the first flow channel is in fluid communication with the second flow channels; and
 wherein the second flow channels formed between two mutually adjacent metal foils run in a straight line and parallel to one another along a radial direction of the honeycomb body.

2. The honeycomb body as claimed in claim 1, wherein the second flow channels between mutually adjacent metal foils are formed by corrugations in the metal foils; and wherein metal foils which are in each case directly mutually adjacent are arranged rotated with respect to one another by an angle of at least 5 degrees about the central axis of the honeycomb body.

3. The honeycomb body as claimed in claim 2, wherein the first flow channel is formed by cutouts in the metal foils stacked on one another.

4. The honeycomb body as claimed in claim 3, wherein the respective cutout in the respective metal foils has a substantially longer first extent (8) in a direction transverse to the direction of extent of the second flow channels formed by the corrugation of the metal foil than the second extent of the cutout in a direction parallel to the direction of extent of the second flow channels formed by the corrugation of the metal foil.

5. The honeycomb body as claimed in claim 3, wherein the cutout along its first longer extent intersects at least 70%, or at least 80%, or at least 90% of the second flow channels formed in the respective metal foil.

6. The honeycomb body as claimed in claim 1, wherein the metal foils forming the honeycomb body are corrugated, wherein metal foils arranged directly mutually adjacent are arranged rotated with respect to one another by in each case 90 degrees around the central axis.

7. The honeycomb body as claimed in claim 1, wherein the second flow channels are aligned in the same direction across the honeycomb body and a smooth metal foil is arranged between each two metal foils having a corrugation.

8. The honeycomb body as claimed in claim 2, wherein the corrugated metal foils have a corrugation with wave crests and wave troughs which run parallel to one another and extend over the entire width of the metal foils.

* * * * *